United States Patent
Suzuki

(10) Patent No.: US 10,499,473 B2
(45) Date of Patent: Dec. 3, 2019

(54) ROBOT STATE NOTIFICATION DEVICE FOR NOTIFYING ABOUT OPERATION STATE OF ROBOT

(71) Applicant: FANUC CORPORATION, Yamanashi (JP)

(72) Inventor: Yuji Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/291,301

(22) Filed: Mar. 4, 2019

(65) Prior Publication Data
US 2019/0274201 A1 Sep. 5, 2019

(30) Foreign Application Priority Data
Mar. 5, 2018 (JP) .................................. 2018-039016

(51) Int. Cl.
- H05B 33/08 (2006.01)
- H02J 7/00 (2006.01)
- B25J 13/06 (2006.01)

(52) U.S. Cl.
CPC .......... *H05B 33/0872* (2013.01); *B25J 13/06* (2013.01); *H02J 7/0063* (2013.01)

(58) Field of Classification Search
CPC ...... H05B 33/0872; B25J 13/06; H02J 7/0063
USPC .......................................................... 215/76
See application file for complete search history.

(56) References Cited

FOREIGN PATENT DOCUMENTS

| JP | 2000-254883 A | 9/2000 |
| JP | 2016-78196 A | 5/2016 |
| JP | 2017-135961 A | 8/2017 |

*Primary Examiner* — Don P Le
(74) *Attorney, Agent, or Firm* — Hauptman Ham, LLP

(57) ABSTRACT

A robot state notification device includes: an LED lamp; a battery; a sensor configured to detect the presence and/or absence of a change of a voltage or a current in an electric cable connected to a robot; an installation unit configured to install the robot state nitrification device to the robot; a battery residual capacity determination unit configured to determine whether or not a residual capacity of the battery fails below a predetermined threshold value; and a lighting control unit configured to control the LED lamp to allow the same to light up in a first lighting content manner when the sensor detects a change of a voltage or a current in the electric cable, and controlling the LED lamp to allow the same to light up in a second lighting content manner when a residual capacity of the battery falls below the predetermined threshold value.

10 Claims, 8 Drawing Sheets

ROBOT STATE NOTIFICATION DEVICE FOR NOTIFYING ABOUT OPERATION STATE OF ROBOT

RELATED APPLICATIONS

The present application claims priority of Japanese Application Number 2018-039016, filed Mar. 5, 2018, the disclosure of which is hereby incorporated by reference herein in its entirety.

BACKGROUND OF THE INVENTION

1. Field of the Invention

The present invention relates to a robot state notification device for notifying about an operation state of a robot.

2. Description of the Related Art

In industrial robots, there are ones that are provided with a light emission element, such as an LED lamp, for notifying an operator in the neighborhood thereof about an operation state thereof or the like.

For example, Japanese Unexamined Patent Publication No. 2016-078196 discloses that "the signal lamp 16 includes LEDs each for emitting, for example, red light, yellow light, or blue light, and such LEDs are suitably selected in accordance with a current state of the robot 1 having a plurality of arms so as to emit light".

For example, Japanese Unexamined Patent Publication No, 2017-135961 discloses that "light emission elements 41 such as LEDs are disposed in the cutout portions 21c'. The light emission elements 41 receives electric power from the battery and emit light. When the control unit 10c mounted in the motor module 10 receives a notification to assign a function from the first terminal 11, the control unit 10c is allowed to light up or blinks the light emission elements 41. By visually confirming the lighting or blinking of the light emitting elements 41, the user A can easily confirm the motor module which is a function assignment target even from a remote location".

For example, Japanese Unexamined Patent Publication No. 2000-254883 discloses that "the light emission unit 21 is connected to a light emission control unit 22. To the light emission control unit 22, the communication unit 23, a usage state detection unit 24, and an information storage unit 25 are connected." and "further, with respect to the communication of information on the tool 20, the light emission elements of the light emission unit 21 are blinkingly displayed on the basis of the information, while the tool information communication unit 17 of the robot 10 is configured to include a Might reception element and the light reception element receives emitted light from the light emission elements as blinkingly displayed, thereby also being capable of performing communication".

SUMMARY OF INVENTION

As industrial robots, there is a robot capable of performing an operation with an operator. Such a robot is not provided with a safety fence in the surroundings thereof and operates at a position near an operator so that there is a risk of a danger, such as a collision of, for example, an arm or the like of the robot. Thus, in order to secure the safety of an operator, the robot for performing an operation with an operator is provided with a robot state notification device for notifying about an operation state of the robot. As a light emission element used in the robot state notification device provided to the robot for performing an operation with an operator, there is, for example, an LED lamp. For example, when "the robot is in operation" or "the robot is in a stand-by state in which the robot can start operating at any time", the LED lamp is turned on, and when "the robot is in a state in which the power of the robot is shut off and is in a complete stop state", the LED lamp is turned off, thereby alerting an operator to an attention. While the LED lamp is fixed to the robot, the LED lamp fails to be seen from an operator depending on a standing position of an operator and a movement of an arm or the like of the robot and it is possible that an operator can no longer accurately grasp the operation state of the robot, which is thus highly dangerous. Further, the LED lamp is fixed to the robot using a screw, an electrical connection is made between the LED lamp and a robot controller through a wired cable, and through the cable, power for turning on the LED lamp is supplied from the robot controller, while a signal (servo-on signal) for indicating the operation state of the robot is received so that reinstalling the LED lamp once installed to the robot at a position from which an operator easily sees the same in order to secure the safety of an operator is not easy. Thus, in the robot state notification device for notifying about the operation state of the robot, there has been desired a technique which can facilitate an installation to the robot and secure the safety of an operator.

According to one aspect of the present disclosure, a robot state notification device including: an LED lamp; a battery configured to supply a power for turning on the LED lamp; a sensor configured to detect the presence and/or absence of a change of a voltage or a current in an electric cable connected to a robot; an installation unit installation configured to install the LED lamp, the battery, and the sensor to the robot in a freely attachable and detachable manner; a battery residual capacity determination unit configured to determine whether or not a residual capacity of the battery falls below a predetermined threshold value; and a lighting control unit configured to control the LED lamp to allow the same to light up in a first lighting content manner when the sensor detects a change of a voltage or a current in the electric cable, and controlling the LED lamp to allow the same to light up in a second lighting content manner different from the first lighting content manner when the battery residual capacity determination unit determines that a residual capacity of the battery falls below the predetermined threshold value without depending on whether or not a change of a voltage or a current in the electric cable is detected by the sensor.

BRIEF DESCRIPTION OF THE DRAWINGS

The present invention will be more clearly understood by referring to the following accompanying drawings.

DETAILED DESCRIPTION

Hereinafter, a robot state notification device for notifying about an operation state of a robot will be described with reference to the drawings. In each figure, similar members are assigned similar reference signs. Further, to facilitate understanding, these figures are suitably changed in scale. Moreover, embodiments illustrated in the figures are one example to be carried out and limitations are not to be made to the embodiments as illustrated.

Figure 1:
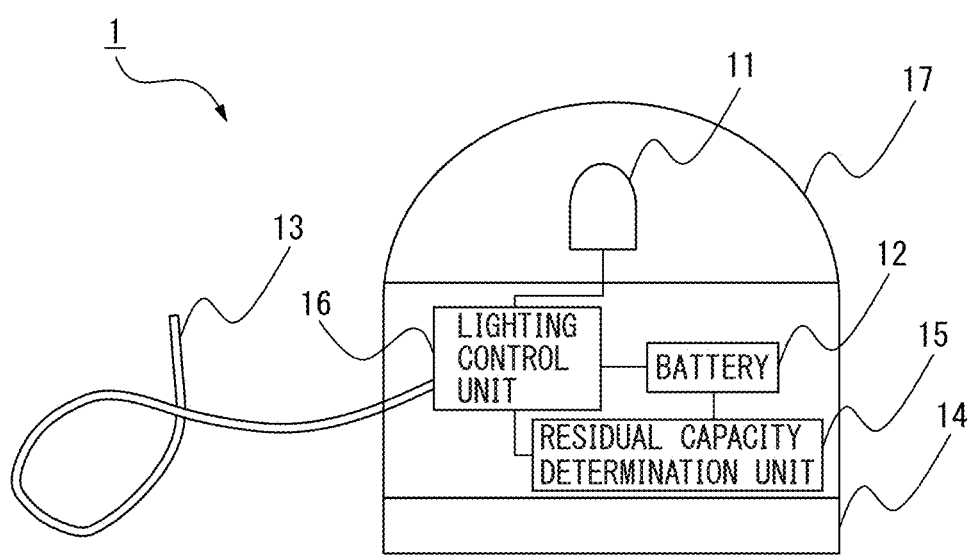
FIG. 1 is a diagram illustrating a robot state notification device according to an embodiment of the present disclosure.

FIG. 1 is a diagram illustrating a robot state notification device according to an embodiment of the present disclosure.

A robot state notification device 1 according to the present embodiment includes an LED lamp 11, a battery 12, a sensor 13, an installation unit 14, a battery residual capacity determination unit 15, and a lighting control unit 16.

The LED lamp 11 is configured to light up using power supplied from the battery 12 and a lighting content thereof is controlled by the lighting control unit 16. The LED lamp 11 is connected through the lighting control unit 16 to the battery 12. The LED lamp 11 is preferably covered with a transparent or semitransparent cover 17 which transmits light. The cover 17 may have a shape, such as a dome shape and a column shape. Further, the cover 17 may be made of a material which diffuse light emitted from the LED lamp 11.

The LED lamp 11 is controlled by the lighting control unit 16 so as to light up in two patterns of lighting content manner in accordance with a detection result by the sensor 13 and a determination result by the battery residual capacity determination unit 15. Examples of an embodiment of the lighting content of the LED lamp II will be later described, but in accordance with a lighting time and a light emission color of, for example, continuous lighting or blinking (intermittent lighting), the lighting content is distinguished. For example, when the lighting content is distinguished in accordance with a difference of a light emission color of the LED lamp 11, one LED lamp 11 for emitting light in two types of colors through a control by the lighting control unit 16 is provided to the robot state notification device 1, or the two LED lamps 11 for emitting light in a single color through a control by the lighting control unit 16 which emit light in colors different from each other are provided to the robot state notification device 1.

The battery 12 supplies power for turning on LED lamp 11. Further, power supplied by the battery 12 is also used as drive power for allowing the battery residual capacity determination unit 15 and the lighting control unit 16 as later described to execute operational processing. The battery 12 may be either of a primary battery (disposable battery) or a secondary battery (rechargeable battery). Examples of the primary battery may include a manganese dry battery, an alkaline manganese dry battery, a nickel dry battery, a silver oxide battery, a mercury battery, a lithium battery, and the like. Further, examples of a shape of the primary battery may include a size D, a size C, a size AA, a size AAA, a size N, a 006P type, a button type, and the like. Moreover, examples of the secondary battery may include a lead acid battery, a lithium ion secondary battery, a lithium ion polymer secondary battery, a nickel hydrogen storage battery, a nickel cadmium storage battery, and the like. When the battery 12 is composed of the primary battery, a housing unit (unillustrated), such as a socket, capable of housing the battery 12 and easily exchanging the same, is provided in the robot state notification device 1. When the battery 12 is composed of the secondary battery, a charging terminal for charging the battery 12 is provided at any position on a surface of the robot state notification device 1.

Note that the robot state notification device 1 may be provided with a power switch (unillustrated) for performing and interrupting a power supply by the battery 12 to the LED lamp 11, the battery residual capacity determination unit 15, and the lighting control unit 16. For example, the robot state notification device 1 is detached from the robot and stored, or when the robot provided with the robot state notification device 1 is at an operation stop for long period, the power switch is turned off, thereby being capable of avoiding wasteful power consumption by the battery 12.

The sensor 13 is a flexible sensor having a cable shape and is wound on an electric cable connected to the robot so as to be capable of being provided to the electric cable. Typically, when a voltage or a current in an electric cable changes, a magnetic field around the electric cable changes. Thus, in the present embodiment, the flexible sensor 13 having a cable shape is configured to be, for example, a magnetic sensor for transforming a change of a magnetic field into an electric signal, is wound on the electric cable connected to the robot, and detects a change of a voltage or a current in the electric cable. Further, for example, the flexible sensor 13 having a cable shape may be configured to be a capacitive sensor for transforming a change of a capacitance into an electric signal. When a current flows through the electric cable, a magnetic field around the electric cable changes, and accordingly also the capacitive sensor can detect a change of a voltage or a current in the electric cable.

As the electric cable connected to the robot, there are a power supply cable for supplying drive power to a motor and the like to move an arm of the robot, a signal cable connected between the robot and a robot controller for controlling the robot and configured to transmit and receive (communicate) various types of electric signals, such as a pulse coder signal and a control signal, and the like. To operate the robot, drive power is supplied through the power supply cable to the robot, and a voltage or a current in the power supply cable changes. Further, to operate the robot, various types of electric signals are transmitted and received through the signal cable, and accordingly a voltage or a current in the signal cable also changes. Thus, from a detection result of the sensor 13 wound on the power supply cable connected to the robot or the signal cable, it can be determined whether "the robot is in an operation state" or "in a complete stop state". A notification of the detection result by the sensor 13 is made to the lighting control unit 16. A determination of an operation state of the robot based on the detection result by the sensor 13 is performed by the lighting control unit 16. Note that depending on the robot, there is one that is configured to include an "operation stand-by state". In the operation stand-by state, drive power is supplied to the robot to brake a motor provided in the robot, and the robot does not physically operate (for example, the arm does not operate) until a drive command is made. In such a robot, as soon as a drive command is received, an operation is started, and thus it is dangerous for an operator to be positioned near the robot in the operation stand-by state. Accordingly, in the robot state notification device 1 according to the present embodiment, a state in which the robot is actually operating and the operation stand-by state are defined as an "operation state of the robot". When the robot is in the operation stand-by state, the robot does not physically operate, while power is supplied through the power supply cable so that when the sensor 13 is wound on the power supply cable, a change of a current and a voltage in the power supply cable in the operation stand-by state can be detected.

The installation unit 14 is configured to install the robot state notification device 1 (i.e. the LED lamp 11, the battery 12, and the sensor 13) to the robot in a freely attachable and detachable manner. Examples of the installation unit 14 may include a magnet, a sucking disk, a sharp projection, such as a pin, a hook and loop fastener, and the like. Further, the installation unit 14 may be configured to be a combination of a plurality of types of the above. In addition, the installation unit 14 may be made of an adhesive agent or a double sided tape capable of plural times of adhesion and release. For example, when the installation unit 14 is configured to be a magnet, the robot state notification device 1 can be easily installed through the installation unit 14 at a part made of a ferromagnetic material in the robot, and also the robot state notification device 1 can be easily detached from the robot. Examples of the ferromagnetic material may include iron, cobalt, nickel, and the like. Further, for example, when the installation unit 14 is configured to be a sucking disk, the robot state notification device 1 can be easily attached and detached with respect to a part at which a surface is smooth and hard in the robot (for example, a part made of plastic). In addition, for example, when the installation unit 14 is configured to be a pin, the robot state notification device 1 can be easily attached and detached with respect to a part at which a surface is soft in the robot (for example, a part made of a rubber, a fabric, or the like). Note that it may be also configured that the plurality of installation units 14 of the types as described above are prepared in advance and the installation unit 14 itself can be exchanged in the robot state notification device 1 in accordance with an installation position of the robot, a material of an installation surface, or the like.

The battery residual capacity determination unit 15 is connected to the battery 12 and the lighting control unit 16 and determines whether or not a residual capacity of the battery 12 falls below a predetermined threshold value. Battery residual capacity determination processing by the battery residual capacity determination unit 15 is executed without depending on whether or not a change of a voltage or a current in the electric cable is detected by the sensor 13. As a parameter for indicating a residual capacity of the battery 12, for example, a voltage value of the battery 12 can be used. In such a case, the battery residual capacity determination unit 15 is configured to be not only an operational processing device for executing determination processing of a residual capacity of the battery 12 but also that which includes a voltage measurement unit (unillustrated) for measuring a voltage of the battery 12. The threshold value used for determination processing of a residual capacity of the battery 12 may be set to be a value greater than or equal to a minimum voltage which allows the LED lamp 11 to be turned on. A notification of a determination result by the battery residual capacity determination unit 15 is made to the lighting control unit 16.

The lighting control unit 16 controls the turn on and turn off of the LED lamp 11 on the basis of the detection result by the sensor 13 and the determination result by the battery residual capacity determination unit 15. A control of the LED lamp 11 by the lighting control unit 16 includes the following three patterns.

First, the lighting control unit 16 controls the LED lamp 11 to allow the same to light up in a first lighting content manner when the sensor 13 detects a change of a voltage or a current in the electric cable on which the sensor 13 is wound. An operator visually recognizes the LED lamp 11 which lights up in the first lighting content manner, thereby being capable of recognizing that the robot is in the operation state (or in the operation stand-by state). For example, while the LED lamp 11 lights up in the first lighting content manner, an operator can continue an operation with safety care so as not to collide with, for example, an arm of the robot.

Second, the lighting control unit 16 controls the LED lamp 11 to allow the same to light up in a second lighting content manner different from the first lighting content manner when the battery residual capacity determination unit 15 determines that a residual capacity of the battery 12 falls below the predetermined threshold value. An operator visually recognizes the LED lamp 11 which lights up in the second lighting content manner, thereby being capable of recognizing that the battery 12 is depleted. For example, when the LED lamp 11 lights up in the second lighting content manner, an operator can take a measure, such as an exchange of the battery 12 to a new battery 12 when the battery 12 is the primary battery and a charge of the battery 12 when the battery 12 is the secondary battery. In a case of battery depletion, the LED lamp no longer lights up even during an operation of the robot, which is dangerous, whereas, according to the present embodiment, an operator can recognize that the battery 12 is depleted when the LED lamp 11 lights up in the second lighting content manner and promptly take a measure, such as an exchange or a charge of the battery 12 so that the safety of an operator can be secured.

Third, the lighting control unit 16 controls the LED lamp 11 to allow the same to be turned off when the sensor 13 does not detect a change of a voltage or a current in the electric cable on which the sensor 13 is wound. An operator visually recognizes the LED lamp 11 which is turned off, thereby being capable of recognizing that the robot is not in the operation state. For example, while the LED lamp 11 is tuned off, an operator can continue a maintenance operation of the robot. Because the LED lamp 11 is turned off, an operator can confirm that a power supply of the robot is turned off and wasteful power consumption due to unintentional no turn off of the power supply can be avoided. Note that when an operator visually recognizes that the LED lamp 11 lights up in the second lighting content manner, for example, if an operator turns off the power supply of the robot, confirms that the LED lamp 11 is turned off, and then performs an exchange or a charging of the battery 12, the safety of an operator can be more reliably secured.

Herein, examples of embodiments of the lighting content of the LED lamp 11 through a control by the lighting control unit 16 will be listed in the following.

According to a first embodiment of the lighting content of the LED lamp 11, one of the first lighting content and the second lighting content is continuous lighting of the LED lamp 11 and the other is blinking of the LED lamp 11. For example, when the robot is in the operation state, the lighting control unit 16 performs a control to allow the LED lamp 11 to continuously light up, and when a residual capacity of the battery 12 falls below the predetermined threshold value, the lighting control unit 16 performs a control to allow the LED lamp 11 to blink.

According to a second embodiment of the lighting content of the LED lamp 11, between the first lighting content and the second lighting content, a blinking cycle of the LED lamp 11 is different. For example, when the robot is in the operation state, the lighting control unit 16 performs a control to allow the LED lamp 11 to blink in a long cycle, and when a residual capacity of the battery 12 falls below the predetermined threshold value, the lighting control unit 16 performs a control to allow the LED lamp 11 to blink in a short cycle (i.e. in a cycle shorter than a blinking cycle when the robot is in the operation state).

According to a third embodiment of the lighting content of the LED lamp 11, between the first lighting content and the second lighting content, a light emission color of the LED lamp 11 is different. For example, when the robot is in the operation state, the lighting control unit 16 performs a control to allow the LED lamp 11 to continuously light up in a white color, and when a residual capacity of the battery 12 falls below the predetermined threshold value, the lighting control unit 16 performs a control to allow the LED lamp 11 to continuously light up in a red color. Note that if the lighting contents are distinguished using the two LED lamps 11 for emitting light in a single color, i.e. for example, when the LED lamp 11 for emitting light in a white color and the LED lamp 11 for emitting light in a red color are provided, the lighting control unit 16 performs a control to allow the LED lamp 11 for emitting light in a white color to continuously light up, and when a residual capacity of the battery 12 falls below the predetermined threshold value, the lighting control unit 16 performs a control to allow the LED lamp 11 for emitting light in a red color to continuously light up.

The battery residual capacity determination unit 15 and the lighting control unit 16 as described above may be configured, for example, in the form of a software program or may be configured by a combination of various types of electronic circuits and a software program. For example, when such units are configured in the form of a software program, an arithmetic processing device, such as a CPU and an IC (integrated circuit), for an operation in accordance with such a software program is provided in the robot state notification device 1, thereby being capable of realizing a function of respective units as described above. Such an arithmetic processing device (the battery residual capacity determination unit 15 and the lighting control unit 16) is driven by power supplied by the battery 12. Further, the battery residual capacity determination unit 15 and the lighting control unit 16 may be collectively configured in the same CPU or IC (integrated circuit). In addition, the battery 12, the battery residual capacity determination unit 15, and the lighting control unit 16 may be respectively provided on separate circuit boards, alternatively may be separately provided on two circuit boards, and further alternatively may be collectively provided on one circuit board (one chip).

Figure 2:
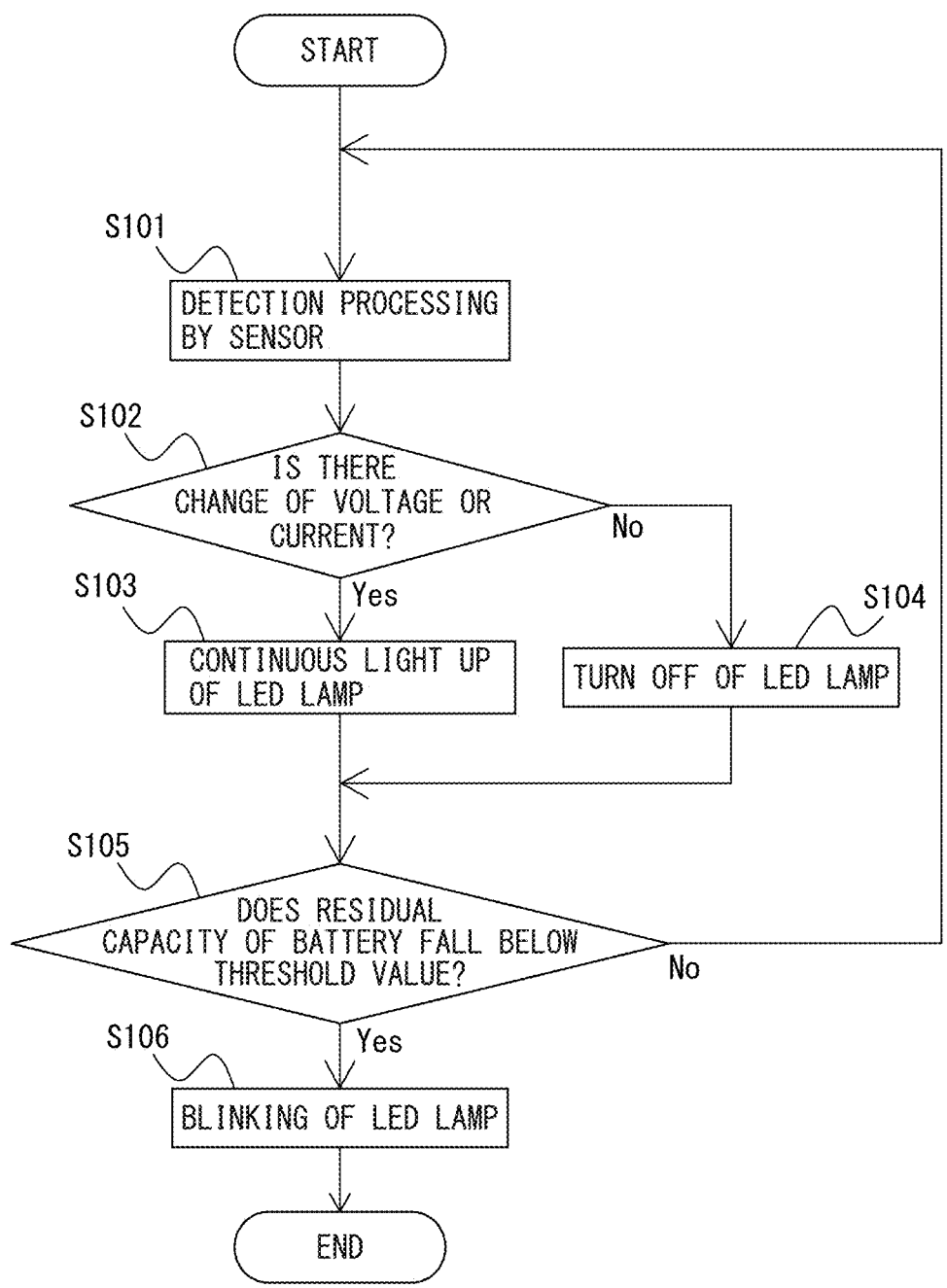
FIG. 2 is a flowchart illustrating an operation flow of the robot state notification device according to an embodiment of the present disclosure.

FIG. 2 is a flowchart illustrating an operation flow of the robot state notification device according to an embodiment of the present disclosure. Herein, by way of example, there will be described an operation flow of the robot state notification device 1 when the lighting content of the LED lamp 11 is according to the first embodiment as described above. In other words, when the robot is in the operation state, the lighting control unit 16 performs a control to allow the LED lamp 11 to continuously light up (step S103), and when a residual capacity of the battery 12 falls below the predetermined threshold value, the lighting control unit 16 performs a control to allow the LED lamp 11 to blink (step S106). Note that the following operation flow can be similarly applied also to a case of the lighting content according to the second embodiment or the third embodiment.

At step S101, the sensor 13 detects a change of a voltage or a current in the electric cable connected to the robot. A notification of a detection result by the sensor 13 is made to the lighting control unit 16.

At step S102, the lighting control unit 16 controls the turn on of the LED lamp 11 on the basis of the detection result by the sensor 13. Further specifically, the lighting control unit 16 determines whether or not a change of a voltage or a current in the electric cable connected to the robot is detected by the sensor 13. As a result of a determination, when a voltage or a current in the electric cable changes, the process advances to step S103 and when a voltage or a current in the electric cable does not change, the process advances to step S104.

At step S103, the lighting control unit 16 performs a control to allow the LED lamp 11 to continuously light up. Accordingly, the LED lamp 11 continuously lights up (first lighting content). Then, the process advances to step S105. While the LED lamp 11 continuously lights up, an operator can continue an operation with safety care so as not to collide with, for example, an arm of the robot.

At step S104, the lighting control unit 16 performs a control to turn off the LED) lamp 11. Accordingly, the LED lamp 11 is turned off. Then, the process advances to step S105.

At step S105, the battery residual capacity determination unit 15 determines whether or not a residual capacity of the battery 12 falls below the predetermined threshold value. As a result of a determination, when a residual capacity of the battery 12 falls below the predetermined threshold value, the process advances to step S106, and when a residual capacity of the battery 12 does not fall below the predetermined threshold value, the process returns to step S101. A notification of a determination result by the battery residual capacity determination unit 15 is made to the lighting control unit 16. Note that battery residual capacity determination processing by the battery residual capacity determination unit 15 at step S105 is executed after processing at steps S103 and S104, and is thus executed without depending on whether or not a change of a voltage or a current in the electric cable is detected by the sensor 13.

At step S106, the lighting control unit 16 performs a control to allow the LED lamp 11 to blink. Accordingly, the LED lamp 11 blinks (second lighting content). When recognizing that the LED lamp 11 blinks, an operator can take a measure, such as an exchange of the battery 12 to a new battery 12 when the battery 12 is the primary battery or a charge of the battery 12 when the battery 12 is the secondary battery.

Figure 3:
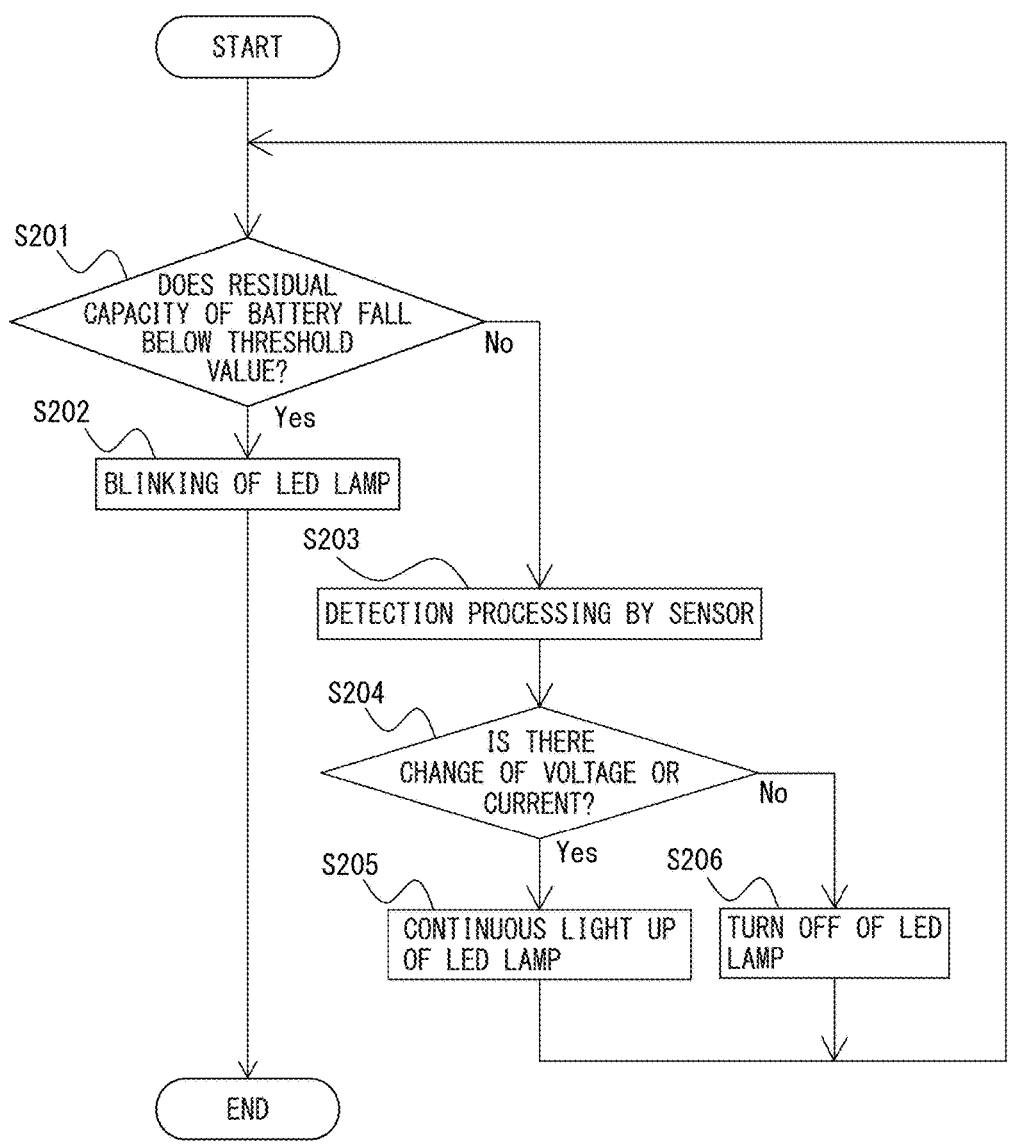
FIG. 3 is a flowchart illustrating another operation flow of the robot state notification device according to an embodiment of the present disclosure.

Note that detection processing by the sensor 13 and battery residual capacity determination processing by the battery residual capacity determination unit 15 may be alternately executed as described in the following. FIG. 3 is a flowchart illustrating another operation flow of the robot state notification device according to an embodiment of the present disclosure. Herein, by way of example, there will be described an operation flow of the robot state notification device 1 when the lighting content of the LED lamp 11 is according to the first embodiment as described above. In other words, when the robot is in the operation state, the lighting control unit 16 performs a control to allow the LED lamp 11 to continuously light up (step S205), and when a residual capacity of the battery 12 falls below the predetermined threshold value, the lighting control unit 16 performs a control to allow the LED lamp 11 to blink (step S201). Note that the following operation flow can be similarly applied also to a case of the lighting content according to the second embodiment or the third embodiment.

At step S201, the battery residual capacity determination unit 15 determines whether or not a residual capacity of the battery 12 falls below the predetermined threshold value. As a result of a determination, when a residual capacity of the battery 12 falls below the predetermined threshold value, the process advances to step S202, and when a residual capacity of the battery 12 does not fall below the predetermined threshold value, the process advances To step S203. A notification of a determination result by the battery residual capacity determination unit 15 is made to the lighting control unit 16. Note that battery residual capacity determination processing by the battery residual capacity determination unit 15 at step S201 is executed before processing at steps S203 to S206, and is thus executed without depending on whether or not a change of a voltage or a current in the electric cable is detected by the sensor 13.

At step S202, the lighting control unit 16 performs a control to allow the LED lamp 11 to blink. Accordingly, the LED lamp 11 blinks (second lighting content).

At step S203, the sensor 13 detects a change of a voltage or a current in the electric cable connected to the robot. A notification of a detection result by the sensor 13 is made to the lighting control unit 16.

At step S204, the lighting control unit 16 controls the turn on of the LED lamp 11 on the basis of the detection result by the sensor 13. Further specifically, the lighting control unit 16 determines whether or not a change of a voltage or a current in the electric cable connected to the robot is detected by the sensor 13. As a result of a determination, when a voltage or a current in the electric cable changes, the process advances to step S205 and when a voltage or a current in the electric cable does not change, the process advances to step S206.

At step S205, the lighting control unit 16 performs a control to allow the LED) lamp 11 to continuously light up. Accordingly, the LED lamp 11 continuously lights up (first lighting content). Then, the process returns to step S201.

At step S206, the lighting control unit 16 performs a control to turn off the LED lamp 11. Accordingly, the LED lamp 11 is turned off. Then, the process returns to step S201.

Figure 4:
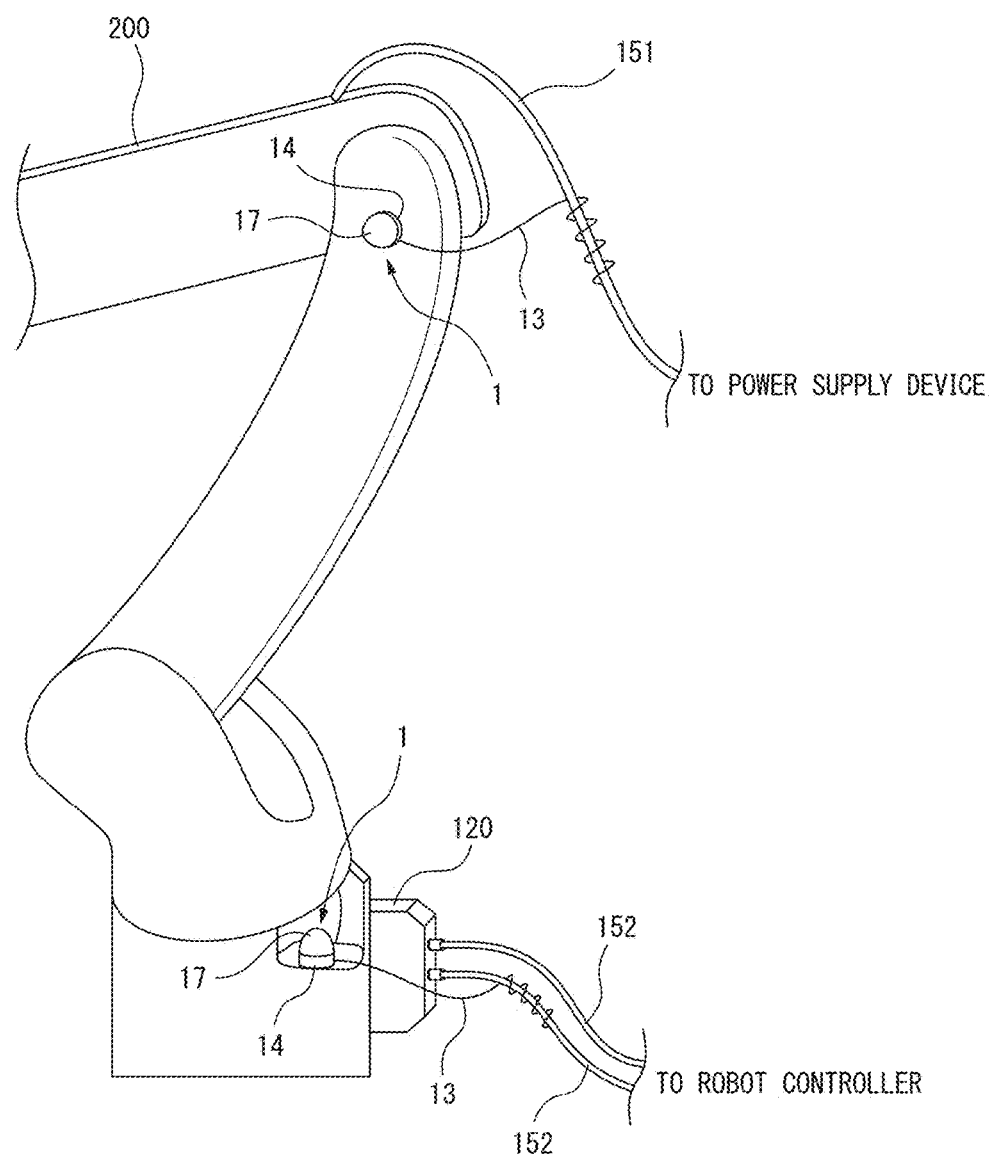
FIG. 4 is a perspective view illustrating an example of an installation of the robot state notification device to a robot according to an embodiment of the present disclosure.

FIG. 4 is a perspective view illustrating an example of an installation of the robot state notification device to a robot according to an embodiment of the present disclosure. To a robot 200, drive power is supplied from a power supply device (unillustrated) through a power supply cable 151, and various types of electric signals, such as a pulse coder signal and a control signal, are transmitted and received (communicated) from a robot controller (unillustrated) through a signal connector 120 and a signal cable 152. Note that in FIG. 4, by way of example, the robot 200 is configured to be an articulated robot, but robots to which the robot state notification device 1 according to an embodiment of the present disclosure can be installed are not limited to the articulated robot.

The robot state notification device 1 according to an embodiment of the present disclosure can be easily installed through the installation unit 14 at an optional position on the robot 200. Further, in consideration of handling of the sensor 13 having a cable shape, a movement path and a standing position of an operator, and the like, the sensor 13 is preferably wound on the electric cable (the power supply cable 151 and the signal cable 152) near an installation position of the robot state notification device 1. Note that the number of the robot state notification device 1 installed to the robot 200 is not limited. In FIG. 4, by way of example, there is illustrated an example in which the two robot state notification devices 1 are installed, but the number of the robot state notification device 1 may be one and may be three or more. For example, when the robot state notification device 1 is installed at a joint portion of the robot 200 near the power supply cable 151, a body of the robot state notification device 1 is installed through the installation unit 14 in such a manner that the cover 17 for housing an LED lamp 11 (unillustrated in FIG. 4) faces horizontally (i.e. in such a manner that light emitted by the LED lamp 11 extends horizontally), and the sensor 13 is wound on the power supply cable 151. Further, for example, when the robot state notification device 1 is installed at a base of the robot 200 near the signal connector 120 and the signal cable 152, the body of the robot state notification device 1 is installed through the installation unit 14 in such a manner that the cover 17 for housing the LED lamp 11 faces upward (i.e. in such a manner that light emitted by the LED lamp 11 extends upward), and the sensor 13 is wound on the signal cable 152. The installation position of the robot state notification device 1 to the robot 200 as illustrated in FIG. 4 is only one example and an installation position other than the same may be suitable. When the robot state notification device 1 is detached from the robot 200, the sensor 13 wound on the power supply cable 151 and the signal cable 152 is unwound. Further, the robot state notification device 1 is installed to the robot 200 through the freely attachable and detachable Installation unit 14 so that detaching the body of the robot state notification device 1 from the robot 200 is also easy.

Thus, the robot state notification device 1 according to the present embodiment includes the battery 12, the sensor 13 having a cable shape, and the detachable installation unit 14 so as to be capable of being easily attached and detached with respect to the robot 200. An operator can easily reinstall the robot state notification device 1 once installed to the robot 200 at a position from which an operator easily sees the same in order to secure the safety of an operator. For example, when changing his standing position, an operator can detach the robot state notification device 1 installed at a left side of the joint portion of the robot 200 and install the same at a right side of the joint portion of the robot 200.

Figure 5:
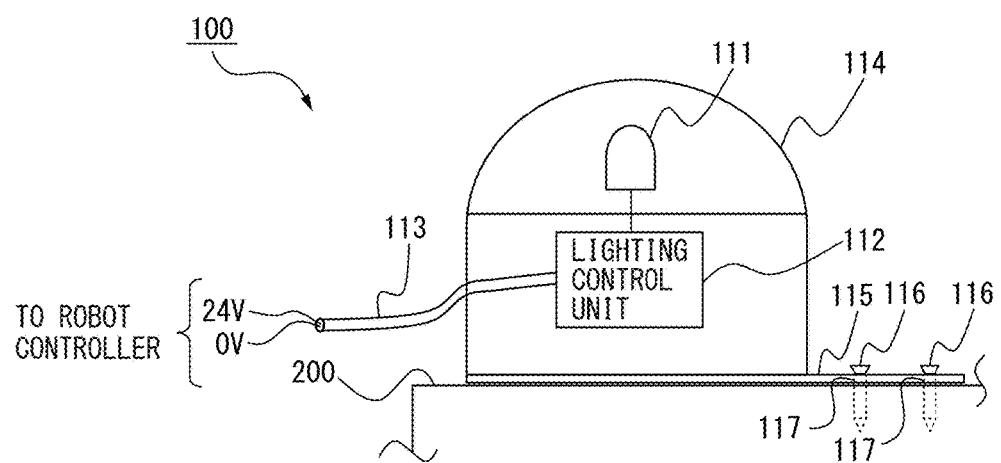
FIG. 5 is a diagram illustrating a conventional robot state notification device.
Figure 6:
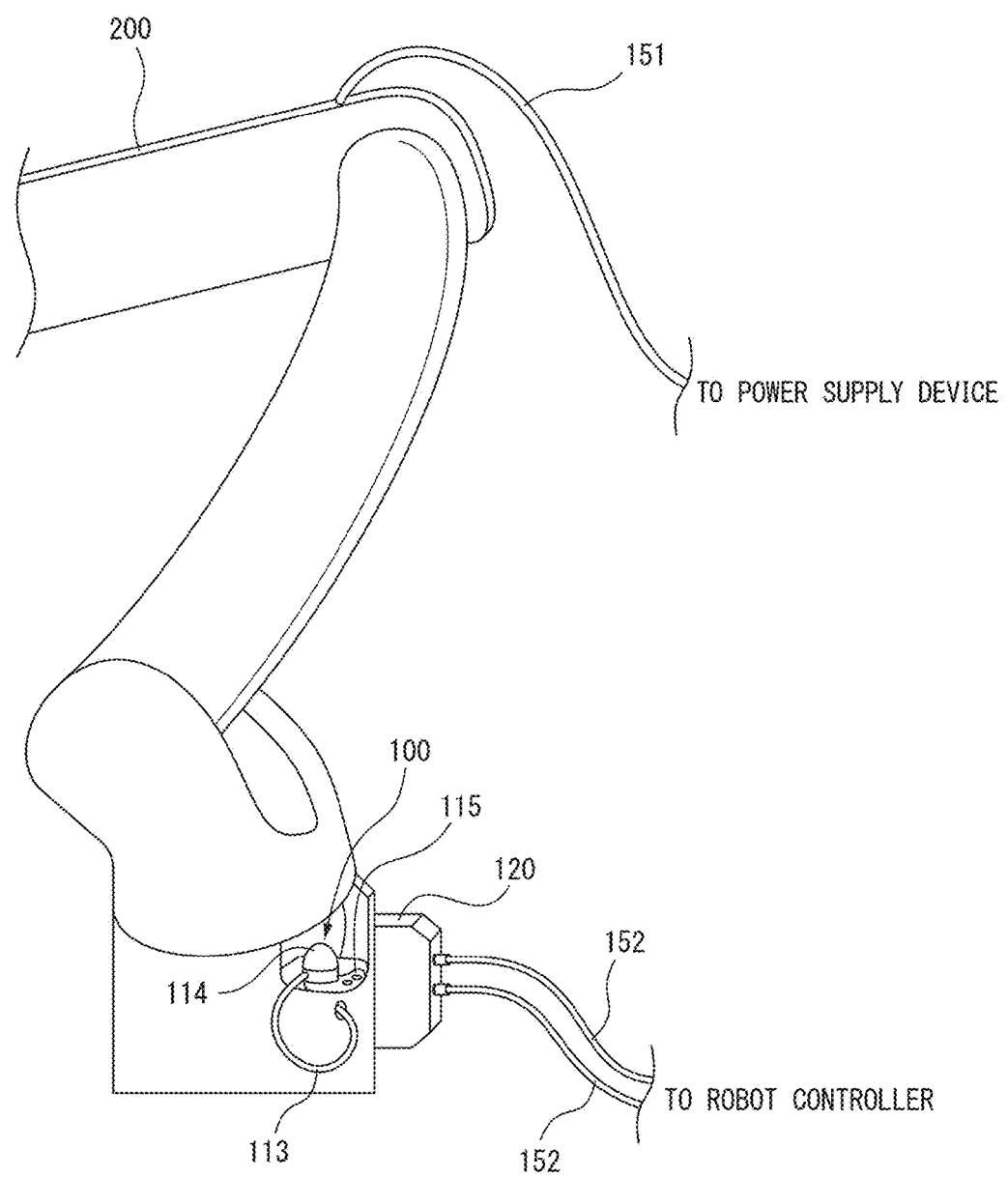
FIG. 6 is a perspective view illustrating an example of an installation of the conventional robot state notification device to a robot.
Figure 7:
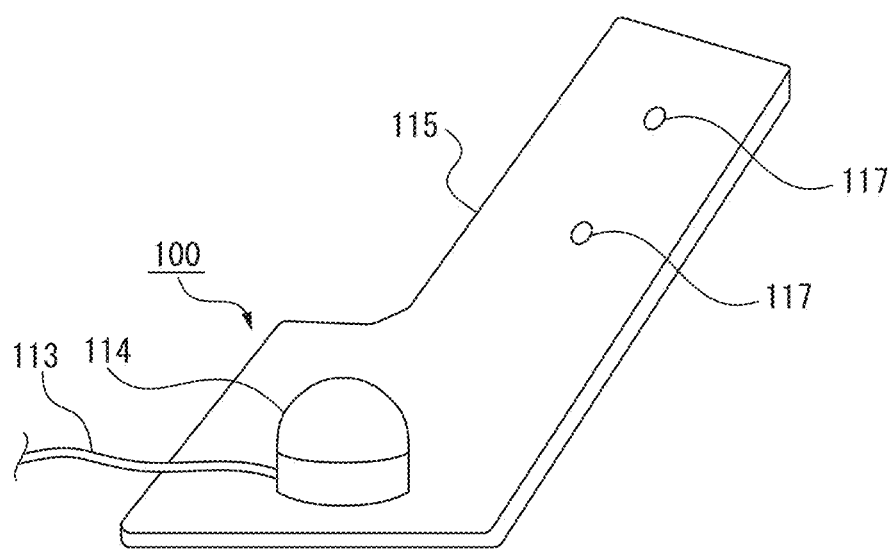
FIG. 7 is a perspective view illustrating an installation plate of the conventional robot state notification device.
Figure 8:
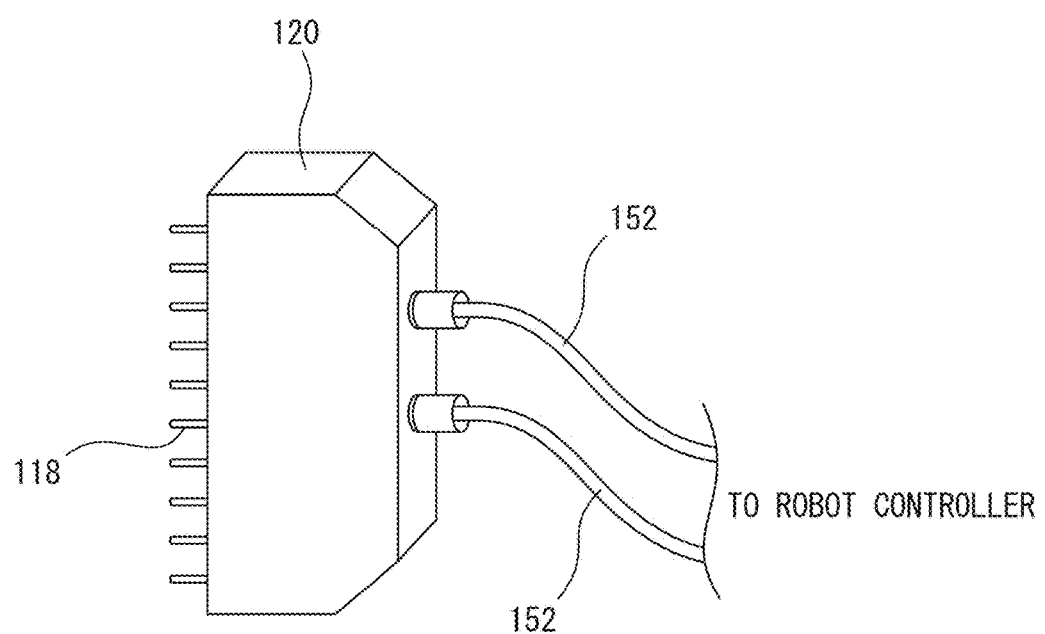
FIG. 8 is a perspective view illustrating a signal connector provided to the robot.

FIG. 5 is a diagram illustrating a conventional robot state notification device. Further, FIG. 6 is a perspective view illustrating an example of an installation of the conventional robot state notification device to a robot. Note that in FIG. 6, by way of example, the robot 200 is configured to be an articulated robot. In addition, FIG. 7 is a perspective view illustrating an installation plate of the conventional robot state notification device. In addition, FIG. 8 is a perspective view illustrating a signal connector provided to the robot.

As illustrated in FIGS. 5 to 8, a conventional robot state notification device 100 includes an LED lamp 111, a lighting control unit 112 for controlling the turn on of the LED lamp 111, a cable 113, a cover 114, an installation plate 115, and a screw 116. The installation plate 115 is provided with a screw hole 117 for allowing the screw 116 to penetrate, and the conventional robot state notification device 100 is fixed to the robot 200 through the installation plate 115 using a screw. Further, an electrical connection is made between the lighting control unit 112 in the conventional robot state notification device 100 and a robot controller (unillustrated) through the cable 113. The cable 113 includes, for example, a 24 V signal line, a 0 V signal line, and the like, power for turning on the LED lamp 111 is supplied from the robot controller, while a signal (servo-on signal) for indicating an operation state of the robot is received. When installing the conventional robot state notification device 100 to the robot 200, an operator first disposes the installation plate 115 at an installation position of the robot 200 (a base of the robot 200 in an example as illustrated in FIG. 6), then inserts the screw 116 into the screw hole 117, and turns the screw to firmly fix a body of the robot state notification device 100 to the robot 200. Then, the cable 113 is connected to the signal connector 120 of the signal cable 152 connected to the robot controller. Further, when reinstalling the conventional robot state notification device 100 installed to the robot 200 at a position from which an operator easily sees the same, an operator releases screwing of the body of the robot state notification device 100 and withdraws the cable 113 from the signal connector 120. In other words, when changing an Installation position of the conventional robot state not device 100, an operator has been required to perform, as a series of operations, a screwing operation of the body of the robot state notification device 100 and a connection operation of the cable 113, and a detaching operation of the screw 116 of the body of the robot state notification device 100 and a withdrawing operation of the cable 113. The screwing operation, the screw detaching operation, the connection operation of the cable 113, and the withdrawing operation of the cable 113 are operations which require labor and time. Thus, in the conventional robot state notification device 100, changing an installation position of the robot 200 is not easy.

On the contrary, the robot state notification device 1 according to an embodiment of the present disclosure can be easily installed through the installation unit 14 at an optional position on the robot 200. When the robot state notification device 1 is installed to the robot 200, the body of the robot state notification device 1 is installed through the installation unit 14 and provided by winding the sensor 13 on the power supply cable 151 and the signal cable 152. When the robot state notification device 1 is detached from the robot 200, the sensor 13 wound on the power supply cable 151 and the signal cable 152 is unwound. A winding operation and an unwinding operation of the sensor 13 on the power supply cable 151 and the signal cable 152 are simple and do not require time in comparison with the connection operation of the cable 113 and the withdrawing operation of the cable 113 are operations which require labor and time. Further, the robot state not device 1 is installed to the robot 200 through the freely attachable and detachable installation unit 14 so that detaching the body of the robot state notification device 1 from the robot 200 is also easy, and is simple and does not require time in comparison with the conventional screwing operation and screw detaching operation.

Thus, the robot state notification device 1 according to the present embodiment includes the battery 12, the sensor 13 having a cable shape, and the detachable installation unit 14 so as to be capable of being easily attached and detached with respect to the robot. Reinstalling the robot state notification device 1 installed to the robot at a position from which an operator easily sees the same is also easy and the safety of an operator can be secured. Further, the robot state notification device 1 according to the present embodiment houses the battery 12 in the interior and is thus unrequired to be supplied with a power supply through a cable from the exterior in a conventional manner is unnecessary so as to have a high degree of freedom of an installation and be also easily portable.

In addition, in the robot state notification device 1 according to the present embodiment, battery residual capacity determination processing by the battery residual capacity determination unit 15 is executed without depending on whether or not a change of a voltage or a current in the electric cable is detected by the sensor 13. In a case of battery depletion, the LED lamp no longer lights up even during an operation of the robot, which is dangerous, whereas, according to the present embodiment, an operator can recognize that the battery 12 is depleted when the LED lamp 11 lights up in the second lighting content manner and promptly take a measure, such as an exchange or a charge of the battery 12 so that the safety of an operator can be secured.

Further, the robot state notification device 1 according to the present embodiment includes the LED lamp 11, the battery 12, the sensor 13, the installation unit 14, the battery residual capacity determination unit 15, and the lighting control unit 16 and the robot state notification device 1 operates alone so as to be also easily additionally installed to an existing robot. In addition, providing the robot with the plurality of robot state notification devices 1 and reducing a number of the plurality of robot state notification devices 1 provided to the robot are also easy. Thus, it is possible to flexibly take a measure for a design change of the robot, a layout change of a factory in which the robot is provided, relocation, and the like and reliably secure the safety of an operator in any situation.

According to one aspect of the present disclosure, there can be realized a robot state notification device for notifying about an operation state of a robot which is easily installed to the robot and can secure the safety of an operator.

The invention claimed is:

1. A robot state notification device comprising:
   an LED lamp;
   a battery configured to supply a power for turning on the LED lamp;
   a sensor configured to detect the presence and/or absence of a change of a voltage or a current in an electric cable connected to a robot;
   an installation unit configured to install the LED lamp, the battery, and the sensor to the robot in a freely attachable and detachable manner;
   a battery residual capacity determination unit configured to determine whether or not a residual capacity of the battery falls below a predetermined threshold value; and
   a lighting control unit configured to control the LED lamp to allow the same to light up in a first lighting content manner when the sensor detects a change of a voltage or a current in the electric cable, and controlling the LED lamp to allow the same to light up in a second lighting content manner different from the first lighting content manner when the battery residual capacity determination unit determines that a residual capacity of the battery falls below the predetermined threshold value without depending on whether or not a change of a voltage or a current in the electric cable is detected by the sensor.

2. The robot state notification device according to claim 1, wherein the lighting control unit controls the LED lamp to allow the same to be turned off when the sensor does not detect a change of a voltage or a current in the electric cable.

3. The robot state notification device according to claim 1, wherein the sensor is a flexible sensor having a cable shape and is wound on the electric cable so as to be provided to the electric cable.

4. The robot state notification device according to claim 1, wherein the electric cable is a power supply cable connected to the robot.

5. The robot state notification device according to claim 1, wherein the electric cable is a signal cable connected between the robot and a robot controller for controlling the robot.

6. The robot state notification device according to claim 1, wherein one of the first lighting content and the second lighting content is continuous lighting of the LED lamp and the other is blinking of the LED lamp.

7. The robot state notification device according to claim 1, wherein between the first lighting content and the second lighting content, a blinking cycle of the LED lamp is different.

8. The robot state notification device according to claim 1, wherein between the first lighting content and the second lighting content, a light emission color of the LED lamp is different.

9. The robot state notification device according to claim 1, wherein the installation unit includes a magnet.

10. The robot state notification device according to claim 1, wherein the sensor includes a magnetic sensor configured to detect a change of a magnetic field due to a change of a voltage or a current in an electric cable.

\* \* \* \* \*